US008492496B2

(12) United States Patent
Kumar et al.

(10) Patent No.: US 8,492,496 B2
(45) Date of Patent: Jul. 23, 2013

(54) COPOLYMERS OF NANOPARTICLES, VINYL MONOMERS AND SILICONE

(75) Inventors: Ramesh C. Kumar, Maplewood, MN (US); Taun L. McKenzie, Hugo, MN (US); Ying-Yuh Lu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 338 days.

(21) Appl. No.: 12/810,458

(22) PCT Filed: Dec. 19, 2008

(86) PCT No.: PCT/US2008/087641

§ 371 (c)(1), (2), (4) Date: Aug. 5, 2010

(87) PCT Pub. No.: WO2009/086079

PCT Pub. Date: Jul. 9, 2009

(65) Prior Publication Data

US 2010/0323570 A1 Dec. 23, 2010

Related U.S. Application Data

(60) Provisional application No. 61/017,474, filed on Dec. 28, 2007.

(51) Int. Cl.
*C08F 230/04* (2006.01)
*C08F 220/10* (2006.01)

(52) U.S. Cl.
USPC ............ 526/241; 526/279; 977/773; 977/810

(58) Field of Classification Search
USPC .......................... 526/241, 279; 977/773, 810
See application file for complete search history.

(56) References Cited

U.S. PATENT DOCUMENTS

| | | | | |
|---|---|---|---|---|
| 2,801,185 | A | 7/1957 | Iler | |
| RE24,906 | E | 12/1960 | Ulrich | |
| 3,786,116 | A | 1/1974 | Milkovich et al. | |
| 3,842,059 | A | 10/1974 | Milkovich et al. | |
| 4,046,795 | A | 9/1977 | Martin | |
| 4,238,393 | A | 12/1980 | Takamizawa et al. | |
| 4,522,958 | A | 6/1985 | Das et al. | |
| 4,728,571 | A | 3/1988 | Clemens et al. | |
| 4,783,490 | A | 11/1988 | Eckberg et al. | |
| 5,032,460 | A | 7/1991 | Kantner et al. | |
| 5,057,619 | A | 10/1991 | Kumar et al. | |
| 5,202,190 | A | 4/1993 | Kantner et al. | |
| 5,648,407 | A | 7/1997 | Goetz et al. | |
| 7,101,616 | B2 | 9/2006 | Arney et al. | |
| 7,241,437 | B2 | 7/2007 | Davidson et al. | |
| 7,384,676 | B2 * | 6/2008 | Hongo et al. | 428/64.1 |
| 7,674,868 | B2 * | 3/2010 | Minge et al. | 526/279 |
| 2008/0146743 | A1 | 6/2008 | Minge et al. | |

FOREIGN PATENT DOCUMENTS

| | | | |
|---|---|---|---|
| CA | 1 233 290 | | 2/1988 |
| EP | 0 250 248 | | 12/1987 |
| EP | 1 544 857 | A1 | 6/2005 |
| EP | 1 835 001 | A1 | 9/2007 |
| WO | 2005/104213 | | 11/2005 |
| WO | 2006/035646 | A1 | 4/2006 |
| WO | 2006/065373 | A1 | 6/2006 |
| WO | 2006/072408 | A1 | 7/2006 |
| WO | 2006/073856 | | 7/2006 |
| WO | WO 2006072408 | A1 * | 7/2006 |
| WO | 2008/143153 | A1 | 11/2008 |

OTHER PUBLICATIONS

Liu et al., "Preparation of Comb-like Styrene Grafted Silica Nanoparticles", *J. Macromol. Sci. Part A—Pure and Applied Chem.*, A41, No. 9, pp. 1001-1010, (2004).

Mu et al., "Well-Defined Dendritic-Graft Copolymer Grafted Silica Nanoparticle by Consecutive Surface-Initiated Atom Transfer Radical Polymerizations", *Ind. Eng. Chem. Res.*, 46, pp. 3069-3072, (2007).

* cited by examiner

*Primary Examiner* — Satya Sastri

(74) *Attorney, Agent, or Firm* — Lisa P. Fulton; James A. Baker

(57) ABSTRACT

A copolymer comprises the reaction product of (a) (meth) acrylate functionalized nanoparticles, (b) vinyl monomer, and (c) silicone macromer. The (meth)acrylate functionalize nanoparticles are selected from the group consisting of silica nanoparticles, zirconia nanoparticles, titania nanoparticles, and combinations thereof.

18 Claims, No Drawings

COPOLYMERS OF NANOPARTICLES, VINYL MONOMERS AND SILICONE

CROSS REFERENCE TO RELATED APPLICATIONS

This application is a national stage filing under 35 U.S.C. 371 of PCT/US2008/087641, filed Dec. 19, 2008, which claims the benefit of U.S. Provisional Application No. 61/017,474, filed Dec. 28, 2007, the disclosure of which is incorporated by reference in their entirety herein.

FIELD

The present invention relates to copolymers of nanoparticles, vinyl monomers, and silicone.

BACKGROUND

Silicone-vinyl copolymers, including those having a vinyl polymeric backbone with silicone pendant groups (see, for example, U.S. Pat. No. 4,728,571 (Clemens et al.)) and those having a silicone polymeric backbone with acrylate pendant groups (see, for example, U.S. Pat. No. 5,202,190 (Kantner et al.)), are known in the art to be useful as release coatings for pressure-sensitive adhesive (PSA) products. When these release coatings are subjected to relatively high temperatures (for example, temperatures above about 50° C.), however, there can be an undesirable build up of peel force and sheet removal force and/or loss in adhesion in PSA products.

SUMMARY

In view of the foregoing, we recognize that there is a need in the art for silicone-vinyl copolymers that when used as release coatings are not as sensitive to relatively high temperatures as conventional silicone-vinyl copolymers.

Briefly, the present invention provides a copolymer comprising the reaction product of (a) (meth)acrylate functionalized nanoparticles, (b) vinyl monomer, and (c) silicone macromer. The (meth)acrylate functionalized nanoparticles are selected from the group consisting of silica nanoparticles, zirconia nanoparticles, titania nanoparticles, and combinations thereof. The silicone macromer is represented by the formula:

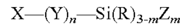

$$X—(Y)_n—Si(R)_{3-m}Z_m$$

wherein:

X is a vinyl group,

Y is a divalent linking group, n is zero or 1,

R is hydrogen, alkyl, aryl, or alkoxy, m is an integer of from 1 to 3, and

Z is a monovalent siloxane polymeric moiety having a number average molecular weight above about 1,000 and is essentially unreactive under copolymerization conditions.

As used herein, the terms "(meth)acryl", "(meth)acrylate", and "(meth)acrylic" refer to acryl and methacryl, acrylates and methacrylates, and acrylic and methacrylic.

The copolymers of the invention can be used as release coatings. Release coatings comprising the copolymers of the invention are more stable at relatively high temperatures than release coatings comprising conventional silicone-vinyl copolymers. In addition, release coatings comprising the copolymers of the invention exhibit stable peel force when a pressure-sensitive adhesive (PSA) is peeled from the release coating.

DETAILED DESCRIPTION

The copolymers of the invention comprise the reaction product of (meth)acrylate functionalized silica nanoparticles, vinyl monomer, and silicone macromer.

(Meth)acrylate Functionalized Nanoparticles

Nanoparticles useful in the copolymers of the invention comprise silicon oxide, zirconium oxide, or titanium oxide. The silicon oxide (silica), zirconium oxide (zirconia), or titanium oxide (titania) nanoparticles have (meth)acrylate surface modification to enable the functionalized nanoparticles to copolymerize with reactive vinyl monomers and silicone macromer. Preferably, the (meth)acrylate functionalized nanoparticles are silica nanoparticles.

Nanoparticles useful in the invention are typically characterized by an average particle diameter size of from about 1 nm up to about 150 nm. As used herein, the term "nanoparticle diameter" (or "nanoparticle size") refers to the maximum cross-sectional dimension of a nanoparticle. Preferably, the nanoparticles are substantially spherical in shape and are relatively uniform in size and remain substantially non-aggregated.

Zirconia nanoparticles typically have a particle size from about 5 to about 150 nm (preferably, about 5 to about 75 nm; more preferably, about 5 to about 25 nm; most preferably, about 5 to about 15 nm). Zirconia nanoparticles useful in the invention are commercially available from Nalco Company (Naperville, Ill.) under the product designation Nalco™ OOSSOO8 and from Buhler (Uzweil, Switzerland) under the product designation WO or WOS. Zirconia nanoparticles can also be prepared as described in U.S. Pat. No. 7,241,437 (Davidson et al.).

Titania nanoparticles typically have a particle diameter size from about 5 to about 50 nm (preferably, about 5 to about 15 nm; more preferably, about 10 nm). Titania nanoparticles useful in the invention are commercially available from mknano (a division of M.K. Impex Cananda, Ontario).

Silica nanoparticles typically have a particle diameter size of about 5 nm up to about 100 nm (preferably, of about 5 nm about to about 20 nm; more preferably of about 5 nm, about 8 nm, or about 20 nm).

A preferred class of silica nanoparticles that can be functionalized for use in the present invention is sols of silica, zirconia, or titania oxides. Sols of amorphous, semi-crystalline, and/or crystalline silica are particularly useful. Such sols can be prepared by a variety of techniques and in a variety of forms, which include hydrosols (where water serves as the liquid medium), organosols (where organic liquids are used), and mixed sols (where the liquid medium comprises both water and an organic liquid). Descriptions of the techniques and forms are described, for example, In U.S. Pat. Nos. 2,801,185 (Iler); 4,522,958 (Das et al.); and 5,648,407 (Goetz et al.).

Useful silica nanoparticles can also be commercially obtained as colloidal dispersions or sols from vendors such as, for example, Nalco Company, Naperville, Ill. (for example, Nalco™ 1040, 1042, 1050, 1060, 1130, 2326, 2327, and 2329 colloidal silicas and W.R. Grace & Co. (for example, Ludox™ colloidal silicas). Preferred commercially available silica nanoparticles include Nalco™ 1130, Nalco™ 2326, and Nalco™ 2327. Nalco™ 1130 silica nanoparticles are most preferred.

(Meth)acrylate functionalized silica nanoparticles can be prepared using coupling agents such as, for example, (meth) acrylate silane coupling agents. Preferred coupling agents include, for example 3-acryloxypropyltrimethoxysilane, 3-methacryloxypropyltrimethoxysilane (A-174 silane), gamma-methacryloxypropyltrimethoxysilane (Z-6030 silane), and methacryloxypropyldimethylchlorosilane (M-8542 silane). A-174 silane is the most preferred silane coupling agent.

The preparation of methacryloxysilane surface functionalized silica sol is described, for example, in U.S. Pat. No. 7,101,616 (Arney et al). The preparation of both acryloxysilane and methacryloxysilane surface functionalized nanoparticles is described, for example, in WO 2006/073856.

A preferred (meth)acrylate functionalized silica nanoparticle can be represented by the general formula:

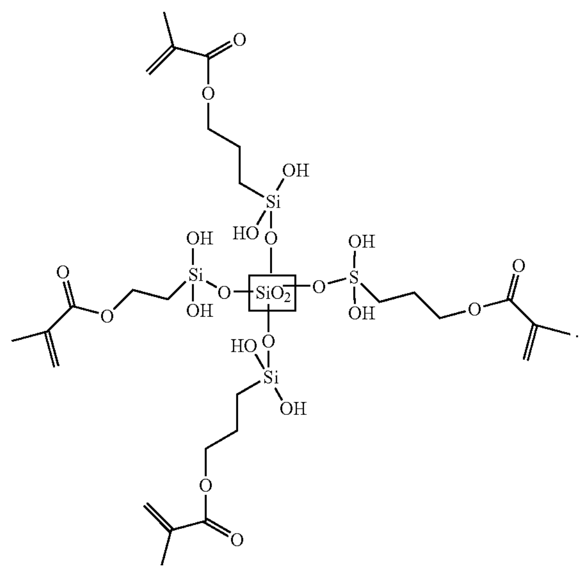

Vinyl Monomers

Examples of useful vinyl monomers for making the copolymers of the invention include, but are not limited to, (meth)acrylates, allylic compounds, vinyl ethers, vinyl esters, and the like. Useful vinyl monomers include, for example, hydroxy ethyl (meth)acrylate, hydroxy butyl (meth)acrylate, isobutyl (meth)acrylate, octadecyl (meth)acrylate, isobornyl (meth)acrylate, hydroxy hexyl (meth)acrylate, hydroxy decyl (meth)acrylate, hydroxy dodecyl (meth)acrylate, methyl (meth)acrylate, (meth)acrylic acid, N-vinyl 2-pyrrolidinone, and hydroxypropyl (meth)acrylic acid, 2-methacryloxypropyltrimethoxysilane, 3-methacryloxypropyltriethoxysilane, 3-acryloxypropyltrimethoxysilane, 3-methacryloxypropyltrichlorosilane, glycidyl (meth)acrylate, acrylonitrile, N-methylol methacrylamide, N-methylol acrylamide, and the like.

Preferred monomers include, for example, (meth)acrylate monomers, styrene, acrylic acid, acrylonitrile, N-vinyl pyrrolidone, and mixtures thereof. More preferred monomers include, for example, methyl (meth)acrylate, isobornyl (meth)acrylate, butyl (meth)acrylate, isopropyl (meth)acrylate, octadecyl (meth)acrylate, styrene, (meth)acrylic acid, acrylonitrile, N-vinyl pyrrolidone, and mixtures thereof.

Preferably, (meth)acrylate monomers are used; more preferably, methyl acrylate and acrylic acid are used.

Silicone Macromer

Silicone macromers that are useful in making the copolymers of the invention are terminally functional polymers having a single functional group (i.e., the vinyl group). Useful silicone macromers are described, for example, in U.S. Pat. No. 4,728,571, (Clemens et al.). Such macromers can be represented by the formula:

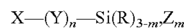

$$X—(Y)_n—Si(R)_{3-m}Z_m$$

wherein:

X is a vinyl group,

Y is a divalent linking group, n is zero or 1,

R is hydrogen, alkyl, aryl, or alkoxy, m is an integer of from 1 to 3, and

Z is a monovalent siloxane polymeric moiety having a number average molecular weight above about 1,000 and is essentially unreactive under copolymerization conditions.

Preferred silicone macromer can be further defined as having an X group having the general formula:

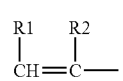

wherein R1 is hydrogen or COOH and R2 is hydrogen, methyl, or $CH_2COOH$.

The Z group has the general formula:

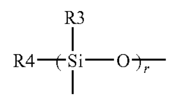

wherein R3 and R5 are independently alkyl, aryl, or fluoroalkyl, R4 is alkyl, alkoxy, alkylamino, aryl, hydroxyl, or fluoroalkyl, and r is an integer of about 5 to about 700. Preferably, R3 and R5 are independently methyl, ethyl, or propyl.

Preferably, the silicone macromer has a general formula selected from the following, where m is 1, 2, or 3; p is zero or 1; R" is alkyl or hydrogen; and X, R, andZ are defined as above:

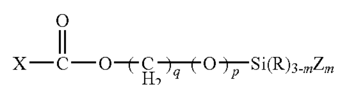

wherein q is an integer from 2 to 6;

$$X—Si(R)_{3-m}Z_m;$$

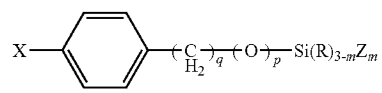

wherein q is an integer from zero to 2;

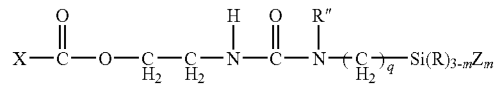

wherein q is an integer from 2 to 6;

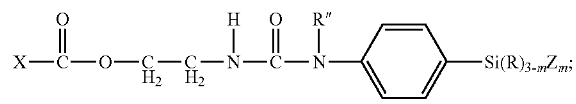

and

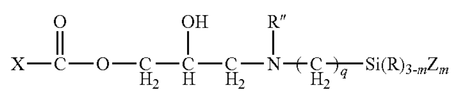

wherein q is an integer from 2 to 6.

Preferably, the silicone macromer has molecular weight range from about 1,000 to about 50,000 (more preferably from about 5,000 to about 25,000; most preferably, about 10,000).

An especially preferred silicone macromer can be represented by the formula:

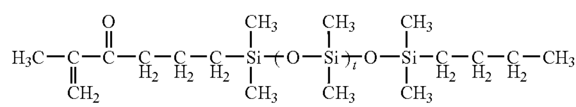

wherein t is from about 10 to about 400.

Silicone macromers (or "macromonomers") are known in the art and can be prepared, for example, by the method disclosed in U.S. Pat. Nos. 3,786,116 (Milkovich et al.) and 3,842,059 (Milkovich et al.). The preparation of polydimethylsiloxane macromonomer and subsequent copolymerization with vinyl monomer have been described in several papers by Y. Yamashita et al. (for example, in Polymer J. 14, 913 (1982); ACS Polymer Preprints 25 (1), 245 (1984); Makromol. Chem. 185, 9 (1984)). This method of macromonomer preparation involves the anionic polymerization of hexamethylcyclotrisiloxane monomer ($D_3$) to form living polymer of controlled molecular weight, and termination is achieved via chlorosilane compounds containing a polymerizable vinyl group.

Suitable monomers for use in the above-mentioned anionic polymerization are, in general, diorganocyclosiloxanes of the formula

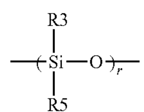

where $R^3$ and $R^5$ are as previously defined and where r is an integer of 3 to 7. Preferred are the cyclic siloxanes where r is 3 or 4 and $R^3$ and $R^5$ are both methyl, these cyclic siloxanes being hereafter designated $D_3$ and $D_4$, respectively. $D_3$, which is a strained ring structure, is especially preferred.

Initiators of the anionic polymerization are chosen such that monofunctional living polymer is produced. Suitable initiators include alkali metal hydrocarbons such as alkyl or aryl lithium, sodium, or potassium compounds containing up to 20 carbon atoms in the alkyl or aryl radical or more, preferably up to 8 carbon atoms. Examples of such compounds are ethylsodium, propylsodium, phenylsodium, butylpotassium, octylpotassium, methyllithium, ethyllithium, n-butyllithium, sec-butyllithium, tert-butyllithium, phenyllithium, and 2-ethylhexyllithium. Lithium compounds are preferred as initiators. Also suitable as initiators are alkali metal alkoxides, hydroxides, and amides, as well as triorganosilanolates of the formula

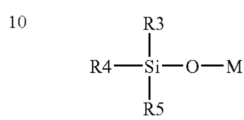

where M is alkali metal, tetraalkylammonium, or tetraalkylphosphonium cation and where $R^3$, $R^4$, and $R^5$ are as previously defined. The preferred triorganosilanolate initiator is lithium trimethylsilanolate (LTMS). In general, the preferred use of both strained cyclic monomer and lithium initiator reduces the likelihood of redistribution reactions and thereby provides siloxane macromonomer of narrow molecular weight distribution which is reasonably free of unwanted cyclic oligomers.

Molecular weight is determined by the initiator/cyclic monomer ratio, and thus the amount of initiator may vary from about 0.004 to about 0.2 mole of organometallic initiator per mole of monomer. Preferably, the amount will be from about 0.008 to about 0.04 mole of initiator per mole of monomer.

For the initiation of the anionic polymerization, an inert preferably polar organic solvent can be utilized. Anionic polymerization propagation with lithium counterion requires either a strong polar solvent such as tetrahydrofuran, dimethyl sulfoxide, or hexamethylphosphorous triamide, or a mixture of such polar solvent with nonpolar aliphatic, cycloaliphatic, or aromatic hydrocarbon solvent such as hexane, heptane, octane, cyclohexane, or toluene. The polar solvent serves to "activate" the silanolate ion, making propagation possible.

Generally, the polymerization can be carried out at a temperature ranging from about −20° C. to about 100° C.; preferably from about −10° C. to about 30° C. Anhydrous conditions and an inert atmosphere such as nitrogen, helium, or argon are typically required.

Termination of the anionic polymerization is, in general, achieved via direct reaction of the living polymeric anion with halogen-containing terminating agents, i.e., functionalized chlorosilanes, to produce vinylterminated polymeric monomers. Such terminating agents may be represented by the general formula $X—(Y)_n—Si(R)_{3-m}Cl_m$, where m is 1, 2, or 3 and where X, Y, n, and R have been previously defined. A preferred terminating agent is methacryloxypropyldimethylchlorosilane. The termination reaction is carried out by adding a slight molar excess of the terminating agent (relative to the amount of initiator) to the living polymer at the polymerization temperature. According to the aforementioned papers by Y. Yamashita et al., the reaction mixture may be ultrasonically irradiated after addition of the terminating agent in order to enhance functionality of the macromonomer. Purification of the macromonomer can be effected by precipitation in methanol.

Copolymers

The present invention provides vinyl-silicone graft copolymers with silica nanoparticles polymerized into the vinyl portions. The copolymers of the invention can be generally represented by the following formula:

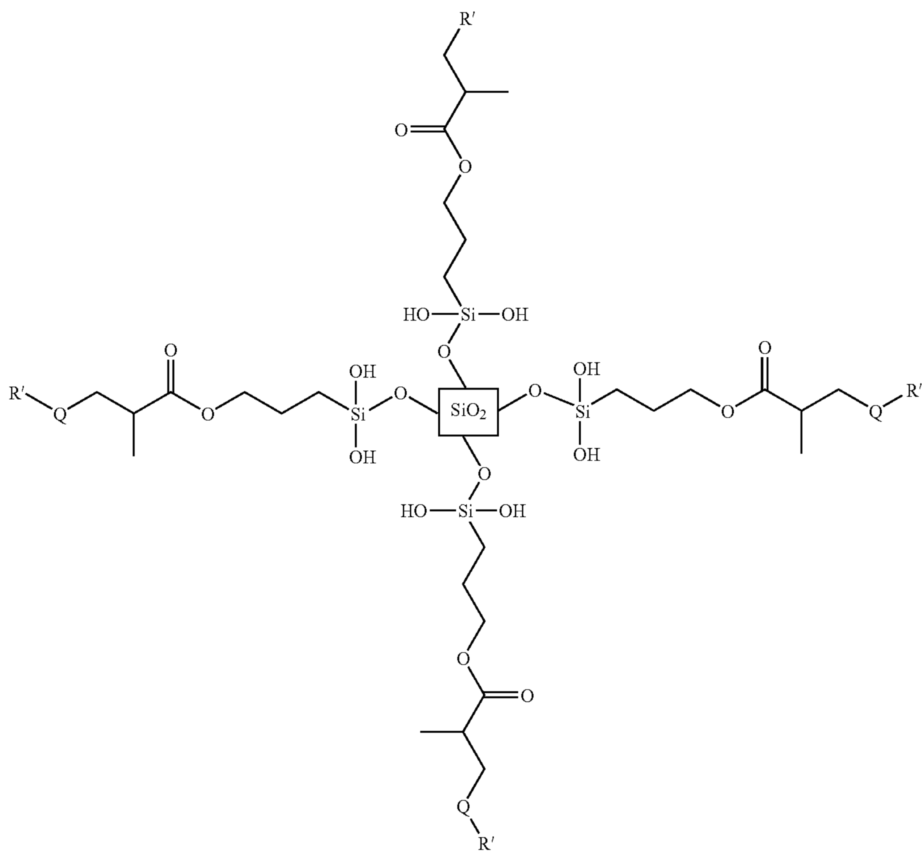

wherein:

$\boxed{SiO_2}$ represents a silica nanoparticle,

R' is —X—$(Y)_n$—$Si(R)_{3-m}Z_m$, wherein X, Y, n, R, m, and Z are as described above, and Q is a vinyl polymeric segment having an average molecular weight of about 500 to about 100,000 (preferably, about 4,000 to about 20,000).

Preferably, Q is a random copolymer formed from monomers selected from the group consisting of (meth)acrylate monomers, styrene, acrylic acid, acrylonitrile, N-vinyl pyrrolidone, and mixtures thereof. More preferably, Q is formed from monomers selected from the group consisting of methyl (meth)acrylate, isobornyl (meth)acrylate, butyl (meth)acrylate, isopropyl (meth)acrylate, octadecyl (meth)acrylate, styrene, (meth)acrylic acid, acrylonitrile, N-vinyl pyrrolidone, and mixtures thereof. Q preferably has an average molecular weight of about 4,000 to about 20,000.

Preferably, X, Y, n, R, m, and Z are as described above. More preferably, R' is

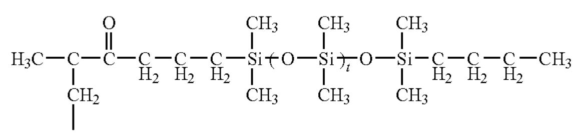

wherein t is from about 10 to about 400.

It will be appreciated by one of skill in the art that the above formula is given merely as a representation of one possible copolymer of the invention and is not intended to limit the copolymers of this invention. One of skill in the art will appreciate, for example, that a silica particle may have more than or less than four vinyl-silicone copolymer "branches" attached to it, and that some of the —OH groups may further react and crosslink.

Method

The copolymers of the invention can be copolymerized by conventional free radical polymerization such as described by Ulrich, U.S. Pat. No. Re. 24,906. The monomers are dissolved in an inert organic solvent and polymerized utilizing a suitable free radical initiator which can be either thermally or photochemically activated. Such initiators include azo compounds such as 2,2'-azobis(isobutyronitrile), hydroperoxides such as tert-butyl hydroperoxide, and peroxides such as benzoyl peroxide or cyclohexanone peroxide. The amount of initiator used is generally about 0.01 to about 5% by weight of the total polymerizable composition.

The organic solvent used in the free radical copolymerization can be any organic liquid which is inert to the reactants and product and which will not otherwise adversely affect the reaction. Suitable solvents include ethyl acetate and mixtures such as ethyl acetate with toluene, heptane with toluene and isopropyl alcohol, and heptane with toluene and methyl alcohol. Other solvent systems are useful. The amount of solvent is generally about 30-80% by weight of the total weight of reactants and solvent. In addition to solution polymerization, the copolymerization can be carried out by other well-known techniques such as suspension, emulsion, and bulk polymerization.

The preferred grafting technique involves copolymerization of (meth)acrylate functionalized nanoparticles, vinyl monomer, and silicone macromer. Other grafting techniques can be employed, however.

The vinyl monomer charge, the initiator, the silicone macromer, the functionalized silica nanoparticles, and the solvent can be charged into any appropriate vessel. Typically, the silicone macromer is present in an amount of about 5 to about 60 weight percent and the nanoparticles are present in an amount of about 1 to about 10 weight percent, based upon the total weight of the vinyl monomer, the silicone macromer and the nanoparticles.

In some embodiments, the weight ratio of (meth)acrylate functionalized silica nanoparticles to vinyl monomer and silicone macromer is about 10:90 or less (preferably, about 5:95 or less; more preferably, about 2:98). In some embodiments the weight ratio of silicone macromer to vinyl monomer is between about 10:90 and about 40:60.

The copolymers of the present invention may, when necessary or desirable, be blended with a compatible modifier in order to optimize physical properties. The use of such modifiers is common in the art. For example, it may be desirable to include such materials as pigments, fillers, stabilizers, or various polymeric additives.

Uses

Surprisingly, the polymerization of the vinyl monomer, silicone macromer, and (meth)acrylate functionalized nanoparticle does not result in gelling. Gels are single macromolecules formed as an infinite network by crosslinking of polymer chains, and are thus insoluble in all solvents below their decomposition temperature (see, for example, *Principles of Polymerization,* 3$^{rd}$ ed., Wiley & Sons, p. 108, (1991)).

The copolymers of the invention can therefore be utilized in coatable compositions. As used herein, the term "coatable" or "coatable composition" means that the composition is soluble or dispersible in solvents or water and is substantially gel-free and that it can be applied to a substrate using standard coating methods. If desired, the coatable compositions can be diluted or dispersed in a liquid (for example, water and/or an organic solvent) before coating a substrate. Preferably, the coating compositions contain from about 2 to about 20 percent solids (more preferably, about 5 to about 10 percent), based upon the weight of the coating composition.

The coatable compositions can be applied to a substrate (or articles comprising a substrate) by standard methods such as, for example, spraying, padding, dipping, roll coating, brushing, or exhaustion. The composition can then be dried to remove any remaining water or solvent.

The coatable compositions are useful as release coatings, and can be applied to surfaces requiring release properties from adhesives. One method of preparation of the release compositions of this invention provides copolymers of high purity, which can be coated directly from the polymerization solvent. The resultant coatings do not require curing or crosslinking However, if solvent resistance is desired for a particular application, crosslinking can be effected by standard methods well known in the art, such as radiation curing (electron beam or ultraviolet light) or chemical crosslinking.

The release coatings of the invention are best used as a coating for a solid substrate, which can be a sheet, fiber, or shaped object. However, the preferred substrates are flexible substrates used for pressure-sensitive adhesive products. Suitable substrates include paper, metal sheets and foils, nonwoven fabrics, and films of thermoplastic resins such as polyesters, polyamides, polyolefins, polycarbonates, polyvinyl chloride, etc., although any surface requiring release toward adhesives can be used. Primers known in the art can be utilized to aid in adhesion of the coating to the substrate, but they are not generally necessary.

The release coating compositions can be applied to suitable substrates by means of conventional coating techniques. The resultant coatings provide effective release for a wide variety of conventional pressure-sensitive adhesives such as natural rubber-based, acrylic, and other synthetic film-forming elastomeric adhesives. The release coating compositions provide stable peel force and good re-adhesion, even in hot and humid conditions.

The release coating compositions are especially useful in release liners and in coated sheet materials (for example, a flexible sheet having the release coating covering at least a portion of its first major surface and an adhesive covering as least a portion of its second major surface). Advantageously, the release coatings of the invention on coated sheet materials are receptive to water- and oil-based inks (for example, ink pens and markers).

EXAMPLES

Objects and advantages of this invention are further illustrated by the following examples, but the particular materials and amounts thereof recited in these examples, as well as other conditions and details, should not be construed to unduly limit this invention.

Materials

| Designator | Name, Formula and/or structure | Availability |
|---|---|---|
| MEK | methyl ethyl ketone | Sigma-Aldrich |
| Ethanol | C2H5OH | Sigma-Aldrich |
| Methanol | CH3OH | Sigma-Aldrich |
| SiMac | methacryloxypropyl polydimethyl silicone | Shin-Etsu |
| VAZO-64 | Azo bisisobutryonitrile | DuPont |
| Isooctyl silane | | Sigma-Aldrich |
| Prostab 5198 | polymerization inhibitor | CIBA |
| MMA | methyl methacrylate | Sigma-Aldrich |
| IBMA | isobutyl methacrylate | Sigma-Aldrich |
| A-174 | 3-methacryloxypropyl trimethoxy silane | Sigma-Aldrich |

Synthesis of Methacryl Modified (A-174 Modified) 5 nm Silica Particles

Nalco 2326 silica sol (400 g), Isooctyl silane (5.4 g), A-174 silane (32.6 g), 80/20 mix of ethanol/methanol (320 g) and ProStab™ 5198 (0.016 g) were charged to a neck 1 L round bottom flask equipped with stirrer, vacuum pump, cold water condenser and hot oil bath. A Therm-o-Watch (TOW) controller was used for the hot oil bath. Dispersion was refluxed for four hours with the TOW set at 80° C. Dispersion was then solvent exchanged from the water and alcohol to MEK via vacuum distillation. Resultant surface modified nanosilica dispersion was approximately 35% solids in MEK.

Synthesis of Methacryl Modified (A-174 Modified) 8 nm Silica Particles

Nalco 1130 silica sol (400 g), Isooctyl silane (6.0 g), A-174 (36.7 g), 80/20 mix of ethanol/methanol (320 g) and ProStab™ 5198 (0.016 g) were charged to a 3 neck 1 L round bottom flask equipped with stirrer, vacuum pump, cold water condenser and hot oil bath. A Therm-o-Watch (TOW) controller was used for the hot oil bath. Dispersion was refluxed for four hours with the TOW set at 80° C. Dispersion was then solvent exchanged from the water and alcohol to MEK via vacuum distillation. Resultant surface modified nanosilica dispersion was approximately 32.2% solids in MEK.

Comparative Example 1

Synthesis of SiMac/IBMA

In a narrow mouthed quart jar were charged 72 g SiMac, 48 g IBMA, 180 g MEK and 0.3602 g VAZO 64. The resulting homogeneous mixture was purged with $N_2$ for 5 minutes. The bottle was sealed and tumbled in a hot water bath at 55° C. for 24 hr. The final solids were 39.1% in MEK.

Example 1

Synthesis of SiMac/IBMA/A-174 Modified 5 nm Silica, 60/35/5

In a narrow mouthed quart jar were charged 72 g SiMac, 42 g IBMA (isobutyl methacrylate), 17.14 g A-174 modified silica (35% solids in MEK), 168.86 g MEK and 0.3602 g VAZO 64. The resulting homogeneous mixture was purged with $N_2$ for 5 minutes. The bottle was sealed and tumbled in a hot water bath at 55° C. for 24 hr. The final solids were 39.4% in MEK. No gels were observed.

Comparative Example 2

Synthesis of MA/NVP/SiMac/AA

In a narrow mouth quart jar were charged 23.5 g MA (methyl acrylate), 18.3 g NVP(N-vinyl pyrrolidone), 2.6 g AA (acrylic acid), 15.7 g SiMac, 160 g MEK and 0.1809 g VAZO 64. The resulting homogeneous mixture was purged with $N_2$ for 5 minutes. The bottle was sealed and tumbled in a hot water bath at 55° C. for 24 hr. The final solids were 29.1%. The solution was diluted to 12.5% solids with 50/50 blend of IPA/toluene before coating on polyethylene terephthalate (PET).

Example 2

Synthesis of MA/NVP/SiMac/AA/A-174 5 nm Modified Silica

In a narrow mouth quart jar were charged 23.1 g MA (methyl acrylate), 17.9 g NVP(N-vinyl pyrrolidone 2.6 g AA (acrylic acid), 15.4 g SiMac, 2.9 g A-174 modified silica (35% solids in MEK), 158 g MEK and 0.1809 g VAZO 64. The resulting homogeneous mixture was purged with $N_2$ for 5 minutes. The bottle was sealed and tumbled in a hot water bath at 55° C. for 24 hr. The final solids were 29.2%. The solution was diluted to 12.5% solids with 50/50 blend of IPA/toluene before coating on PET.

Example 3

Synthesis of MA/NVP/SiMac/AA/A-174 5 nm Modified Silica

In a narrow mouth quart jar were charged 22.5 g MA (methyl acrylate), 17.5 g NVP(N-vinyl pyrrolidone), 2.5 g AA (acrylic acid), 15 g SiMac, 7.2 g A-174 modified silica (35% solids in MEK), 155.3 g MEK and 0.1809 g VAZO 64. The resulting homogeneous mixture was purged with $N_2$ for 5 minutes. The bottle was sealed and tumbled in a hot water bath at 55° C. for 24 hr. The final solids were 29.1%. The solution was diluted to 12.5% solids with 50/50 blend of IPA/toluene before coating on PET.

Adhesion Testing

The solutions of Comparative Example 2 and Examples 2 and 3 were coated on PET (1.4 mil 2SAB, available from Mitsubishi) with #3 Meyer rod and the resulting coatings were dried at 65° C. for 30 minutes. The coatings were laminated against Post-it™ Easel Pad (available from 3M Company) and pressed for 30 seconds at 20.7 MPa (3000 psi). Adhesion was measured according to ASTM D3330 after aging for 5 days at constant temperature of 21° C. and constant humidity of 50% (CT/CH) and 5 days at 49° C. by removing or peeling the adhesive coated 1" (2.54 cm) strip from the release coating of the invention and then laminating the strip onto a glass plate. The adhesion results are listed in the table below.

| | Readhesion N/dm | |
|---|---|---|
| | Aged 5 days at CT/CH | Aged 5 days at 49° C. |
| Comparative Example 2 | 23.3 | 21.8 |
| Example 2 | 28.9 | 27.5 |
| Example 3 | 28.4 | 28.6 |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A copolymer comprising the reaction product of:

(a) (meth)acrylate functionalized nanoparticles selected from the group consisting of silica nanoparticles, zirconia nanoparticles, titania nanoparticles, and combinations thereof, (b) vinyl monomer, selected from the group consisting of styrene, (meth)acrylic acid, acrylonitrile, N-vinyl pyrrolidone, methyl (meth)acrylate, isopropyl (meth)acrylate, butyl (meth)acrylate, isobutyl (meth)acrylate, octadecyl (meth)acrylate, isobornyl (meth)acrylate, hydroxyethyl (meth)acrylate, hydroxybutyl (meth)acrylate, hydroxyhexyl (meth)acrylate, hydroxydecyl (meth)acrylate, hydroxydodecyl (meth)acrylate, 2-methacryloxypropyltrimethoxysilane, 3-methacryloxypropyltriethoxysilane, 3-acryloxypropyltrimethoxysilane, 3-methacryloxypropyltrichlorosilane, glycidyl (meth)acrylate, N-methylol methacrylamide, N-methylol acrylamide, and mixtures thereof, and (c) silicone macromer represented by the formula:

$$X—(Y)_n—Si(R)_{3-m}Z_m$$

wherein the copolymer is i

X is a vinyl group,

Y is a divalent linking group, n is zero or 1,

R is hydrogen, alkyl, aryl, or alkoxy, m is an integer of from 1 to 3, and

Z is a monovalent siloxane polymeric moiety comprising an Si—O—Si group and having a number average molecular weight above about 1,000 and is essentially unreactive under copolymerization conditions.

2. The copolymer of claim 1 wherein the (meth)acrylate functionalized nanoparticles are silica nanoparticles.

3. The copolymer of claim 2 wherein the (meth)acrylate functionalized nanoparticles are the reaction product of silica nanoparticles and 3-methacryloxypropyltrimethoxysilane.

4. The copolymer of claim 2 wherein the (meth)acrylate functionalized nanoparticles are represented by the formula:

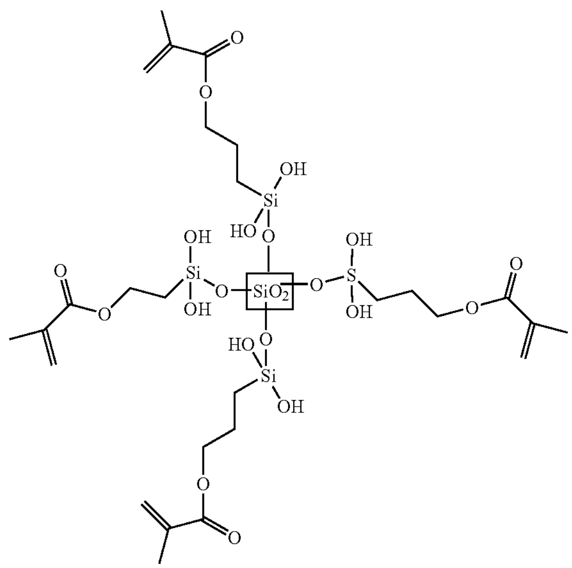

wherein

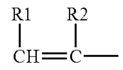

represents a silica nanoparticle.

5. The copolymer of claim 2 wherein the nanoparticles have an average particle diameter size between about 5 nm and about 100 nm.

6. The copolymer of claim 1 wherein X is represented by the formula:

R1 R2
CH=C— wherein R1 is hydrogen or COOH and R2 is hydrogen, methyl, or $CH_2COOH$.

7. The copolymer of claim 1 wherein R is methyl, ethyl, or propyl.

8. The copolymer of claim 1 wherein Z is represented by the formula:

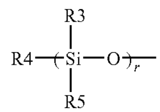

wherein R3 and R5 are independently alkyl, aryl, or fluoroalkyl, R4 is alkyl, alkoxy, alkylamino, aryl, hydroxyl, or fluoroalkyl, and r is an integer of about 5 to about 700.

9. The copolymer of claim 8 wherein R3 and R5 are independently methyl, ethyl, or propyl.

10. The copolymer of claim 1 wherein the silicone macromer is represented by the formula:

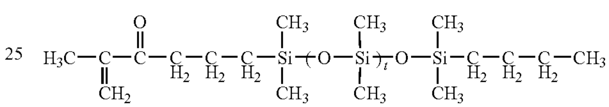

wherein t is from about 10 to about 400.

11. The copolymer of claim 1 wherein the silicone macromer has a number average molecular weight of about 1,000 to about 50,000.

12. The copolymer of claim 1 wherein the copolymer includes vinyl polymeric segments having an average molecular weight of about 500 to about 100,000.

13. The copolymer of claim 1 wherein the weight ratio of (meth)acrylate functionalized silica nanoparticles to vinyl monomer and silicone macromer is about 10:90 or less.

14. The copolymer of claim 1 wherein the weight ratio of silicone macromer to vinyl monomer is between about 10:90 and about 40:60.

15. A composition comprising the copolymer of claim 1, wherein the composition is coatable.

16. The composition of claim 15 wherein the composition is a release coating.

17. An article comprising a substrate having one or more surfaces coated with the composition of claim 15, optionally wherein the substrate comprises paper, a metal sheet, a metal foil, non-woven fabric, or a film of a thermoplastic resin.

18. A coated sheet material comprising a flexible sheet having the release coating of claim 16 covering at least a portion its first major surface and an adhesive covering at least a portion of its second major surface.

* * * * *